Feb. 6, 1968  F. H. MIYANAGA  3,367,722
WHEEL COVER
Filed July 5, 1966

INVENTOR.
FRANK H. MIYANAGA
BY Jack M. Wiseman
ATTORNEY

United States Patent Office 3,367,722
Patented Feb. 6, 1968

3,367,722
WHEEL COVER
Frank H. Miyanaga, 1726 Mossbrook Ave.,
San Jose, Calif. 95130
Filed July 5, 1966, Ser. No. 562,573
3 Claims. (Cl. 301—37)

ABSTRACT OF THE DISCLOSURE

A wheel cover for a vehicle wheel in which a support bracket is attached to the rim flange of a hub of a wheel. Attached to the support bracket is a cover element of the wheel cover, which serves to cover the outer lateral surface of the vehicle wheel. The cover element includes a well which is adapted to contain the stem of at least one air valve for tire inflation purposes.

A portion of the cover element is removable to provide access to the well. Toward this end, a magnet is attached to the removable portion of the cover element and is disposed within the well. Also, a magnetizable element is attached to the support bracket and is disposed within the well.

---

The present invention relates in general to wheels for vehicles, and more particularly to a cover for a vehicle wheel.

In the case of the conventional vehicle wheel, the outer lateral surface thereof is exposed to view. Such surface, presented by the usual hub cap and the spokes or wheel dish, is usually of unsightly appearance.

Attempts have been made in the prior art to improve the appearance of vehicle wheels. Such attempts, however, have often involved substantial changes in the basic design of the wheel.

Accordingly, it is an object of the present invention to provide a wheel cover, which is of comparatively simple design, and is highly decorative.

Another object of the present invention is to provide a wheel cover which is employable in connection with vehicle wheels of conventional design.

Still another object of the present invention is to provide a wheel cover which is readily mountable on a wheel having a tire thereon, and in which provision is made for easy access to tire-inflation valves.

Other and further objects and advantages of the present invention will become apparent to one skilled in the art from the following description taken in conjunction with the accompanying drawings, in which.

Figure 1:
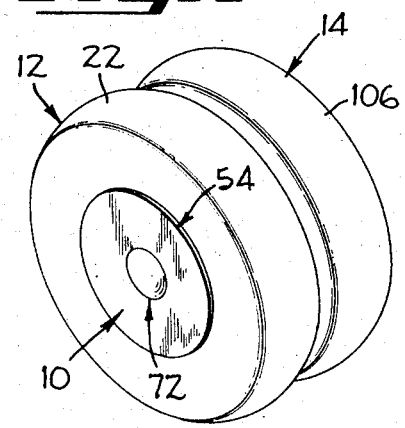
FIG. 1 is a perspective view of a set of dual wheels of a trailer truck.

Illustrated in FIG. 1 is the wheel cover 10 of the present invention shown mounted on the outer wheel 12 of a set of dual wheels 12 and 14 of a trailer-truck or the like.

Figure 2:
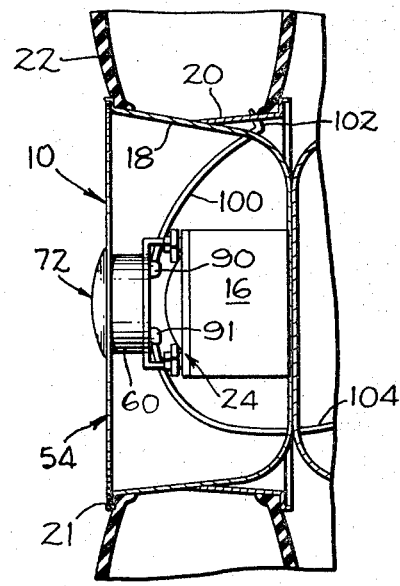
FIG. 2 is an enlarged vertical cross-sectional view of a portion of the wheel structure of FIG. 1.
Figure 3:
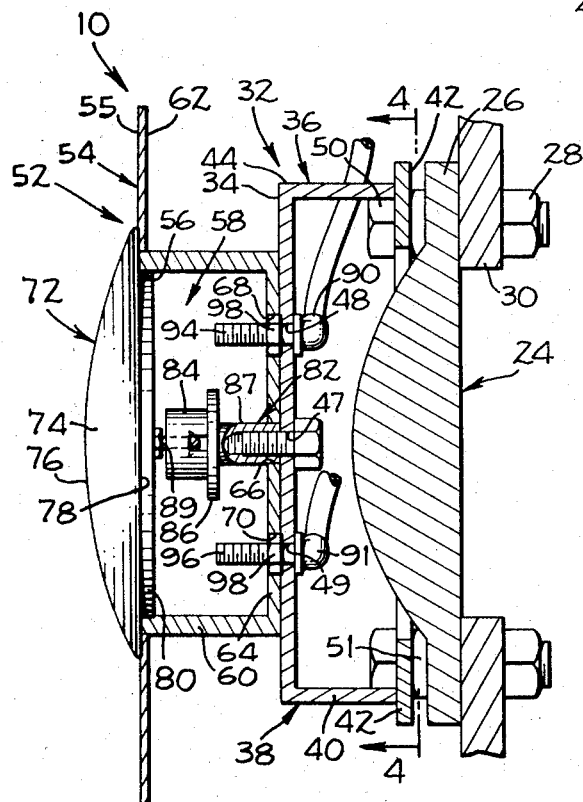
FIG. 3 is a further enlarged vertical cross-sectional view of a portion of the wheel structure of FIGS. 1 and 2.
Figure 4:
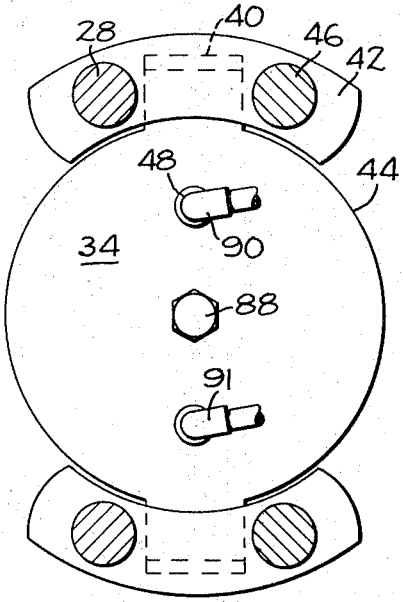
FIG. 4 is a vertical cross-sectional view taken along the line 4—4 of FIG. 3.

The wheels 12 and 14 are conventional and well-known. Thus, the wheel 12 (See also FIG. 2) is constructed of a hub 16 which is surrounded by a dish 18. Surrounding the dish 18 is a rim 20, which is formed with an angular circumferential flange 21. The rim 20 carries a tire 22. A hub cap 24 (See also FIG. 3) provides a circumferential flange 26, which is secured by means of bolts 28 to the outer end wall 30 of the hub 16.

The cover 10 of the present invention includes a support bracket 32, which is formed of a disc or cylindrical plate 34 and two diametrically opposite mounting brackets 36 and 38. Each of the mounting brackets 36 and 38 is formed of a spacer arm 40 and an integrally formed attachment members 42. The arms 40 are disposed in parallel relation and project from the side edge 44 of the plate 34 in the same direction and perpendicular thereto. The attachment members 42 are fixed to the respective arms 40, and extends parallel to the plate 34. Each attachment member 42 is of curved shape and is provided with two apertures 46, positioned to receive two of the bolts 28, respectively. The arcuate configuration of the attachment members 42 conform to the peripheral configuration of the hub cap 24. The plate 34 is provided with a central circular aperture 47 and with two off-center circular apertures 48 and 49. A suitable nut 50 and washer 51 are associated with each of the bolts 28 for securing the respective attachment members 42 to the rim flange 26 of the hub cap 24.

The cover 10 includes a cover element 52, which is formed with a disc 54. The disc 54 is preferably constructed of a metal, such as, for example, aluminum orstainless steel. At its outer surface 55, the disc 54 is highly polished so as to be light reflective. The disc 54 is provided with a centrally located circular opening 56, which provides access to a well 58. The well 58 is defined by a cylindrical side wall 60 projecting with its axis at right angles from the inner surface 62 of the disc 54 and a disc inner end wall 64 extending parallel to the disc 54. The wall 64 is provided with a central circular aperture 66 and two off-center circular apertures 68 and 70. The wall 64 lies in abutment with the bracket plate 34 with the apertures 66, 68 and 70 registering with the apertures 47, 48 and 49, respectively.

Covering the opening 56 is a circular cap 72. The cap 72 provides a cap element 74 which is non-metallic, being preferably of wood or plastic. The outer surface 76 of the cap 72 is rounded. The inner surface 78 thereof is generally flat, and is of greater diameter than the diameter of the opening 56. Secured to the inner surface 78 is a circular base wall 80. The base wall 80 is of the same diameter as that of the opening 56.

Means utilizing magnetic force are provided for attachment of the cover element 52 to the mounting bracket 32. Such attachment means include an attachment member 82 and a magnet 84. The attachment member 82 is constructed of a magnetizable plate 86, which is mounted on a hollow, internally threaded stem 87. Threadably inserted within the stem 87 is a bolt 88. The stem 87 lies within aperture 66 in the wall 64 and extends into the well 58. The bolt 88 passes through the aperture 47 in the wall 34 and serves to secure the attachment member 82 to the wall 34. The magnet 84 is of conventional type and is secured by means of a bolt 89 to the base wall 80.

Two air valves 90 and 91 of conventional structure are mounted on the bracket wall 34. The valves 90 and 92 provide two threaded stems 94 and 96, respectively. The stem 94 passes through the registering apertures 48 and 68. The stem 96 passes through the registering apertures 49 and 70. Each of the stems 94 and 96 extends within the well 58. The valves 90 and 92 are each secured to the wall 34 by means of a nut 98, which is positioned within the respective apertures 68 or 70. An air conduit 100 interconnects the air valve 90 and a tire valve 102 for the tire 22 in conventional manner. An air conduit 104 similarly connects the air valve 91 to a tire valve (not shown) for the tire 106 of the wheel 14.

The cap 82 is normally in the closed position in which the base wall 80 is seated within the opening 56. The magnet 84 thus magnetizes the plate 86 and becomes tightly secured to the latter. As a consequence thereof, the cap 72 at the inner surface 78 thereof is caused to bear tightly against the outer surface 55 of the disc 54. The cover element 52 is thus maintained in its operative position of attachment to the bracket 32.

The disc 54, when the cover 10 is mounted on the wheel 12, bears against the circumferential flange 21 of the rim 20. The disc 54 thus serves to cover the outer lateral surface of the wheel 12, as presented by the dish 18 and the hub cap 24. The light-reflective outer surface 55 of the disc 54 imparts a decorative appearance to the wheel 12. The cap 72, being non-metallic, provides a contrast which adds to the decorative effect.

When it is desired to inflate the tires 22 and 106, the cap 72 may be manually removed from closed position, and the well 58 thus opened. Air conduits (not shown) may then be connected to the air valves 90 and 91, in conventional manner for the supply of air under pressure to the latter. After the tires 22 and 106 have been inflated, the cap 72 may be manually returned to closed position.

The cover 10 of the invention presents a number of special advantages with respect to the structure and operation thereof. As one particular advantage, the cover 10 may be employed in conjunction with vehicle wheels which are of conventional design. In addition, the cover 10 provides a highly decorative lateral surface for the wheel on which it is mounted, while at the same time enabling easy access to the air valves for tire-inflation purposes.

It is to be understood that modifications and variations of the embodiment of the invention disclosed herein may be resorted to without departing from the spirit of the invention and the scope of the appended claims.

Having thus described my invention, what I claim as new and desire to protect by Letters Patent is:

1. A cover for a vehicle wheel comprising a cover element adapted to cover the outer lateral surface of the vehicle wheel, said cover element being formed with a well, a portion of said cover element being removable to provide access to said well, support means for said cover element and adapted for mounting on the vehicle wheel, attachment means for securing said cover element to said support means, a first magnetic element disposed in said well and attached to the removable portion of said cover element, and a second magnetic element attached to said support means and disposed centrally in said well and disposed adjacent said first magnetic element, said first and second magnetic elements being arranged to retain said removable portion of said cover element with said cover element.

2. A cover for a vehicle wheel as claimed in claim 1 wherein said well is adapted to contain the stem of at least one air valve for tire-inflation purposes.

3. A well as claimed in claim 1 in which said cover element includes a disk for covering said wheel surface, said disk being formed with an opening for said well, said removable portion of said cover element being a cap covering said opening.

References Cited

UNITED STATES PATENTS

| | | | |
|---|---|---|---|
| 2,015,352 | 9/1935 | Reid | 301—108 |
| 2,837,376 | 6/1958 | Bruno | 301—5.7 X |
| 2,900,007 | 8/1959 | Hoogendoorn | 152—415 |
| 3,037,544 | 6/1962 | Gouirand | 152—415 |
| 3,170,733 | 2/1965 | Lamme | 301—37 |

FOREIGN PATENTS 630,176   10/1949   Great Britain.

RICHARD J. JOHNSON, *Primary Examiner.*